E. ANTZ.
CUTTER BAR FOR MOWERS.
APPLICATION FILED OCT. 20, 1917.

1,284,037.

Patented Nov. 5, 1918.

WITNESSES

INVENTOR
E. Antz
BY
ATTORNEYS

UNITED STATES PATENT OFFICE.

EUGENE ANTZ, OF ADAMS, IDAHO.

CUTTER-BAR FOR MOWERS.

1,284,037.  Specification of Letters Patent.  Patented Nov. 5, 1918.

Application filed October 20, 1917. Serial No. 197,619.

*To all whom it may concern:*

Be it known that I, EUGENE ANTZ, a citizen of the United States, residing in the county of Adams and State of Idaho, have invented a new and Improved Cutter-Bar for Mowers, of which the following is a full, clear, and exact description.

My invention relates to an attachment for mowing machines whereby a clear cut can be made at the outer end of the finger bar. An object of the invention is to provide an attachment which can be easily and quickly applied to a mowing machine.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

When using a mowing machine with an ordinary finger bar for cutting clover or alfalfa, the cut is not well defined, as the plants grow bushlike and the cut and uncut parts of the plant are interwoven and cannot well be separated by the swath board of the machine. In consequence the operator is likely to run in or out too far, as he cannot clearly distinguish the line, and either leaves a portion of the grass uncut, thus leaving a ragged field and interfering with the raking, or else he cuts a narrow swath and chops up a portion of the grass which has already been mowed. To obviate the above I provide an extension of the finger bar for making an upward cut at the end of the sickle bar.

Figure 1:
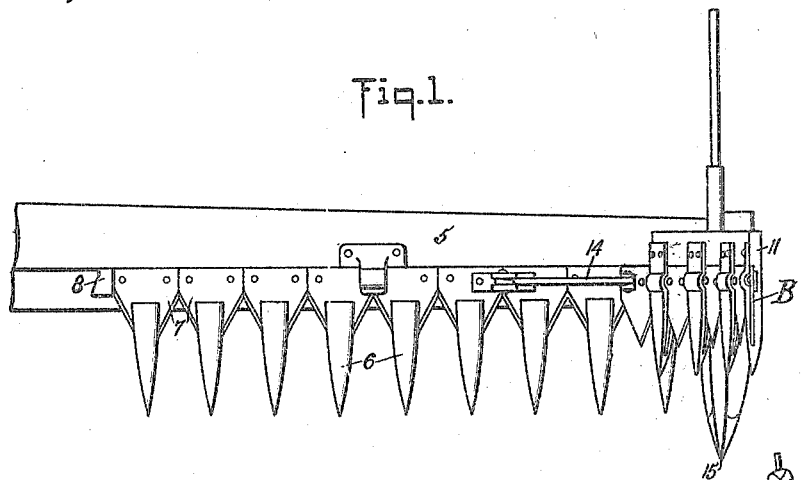
Figure 1 is a top plan view of a finger bar embodying my invention.
Figure 2:
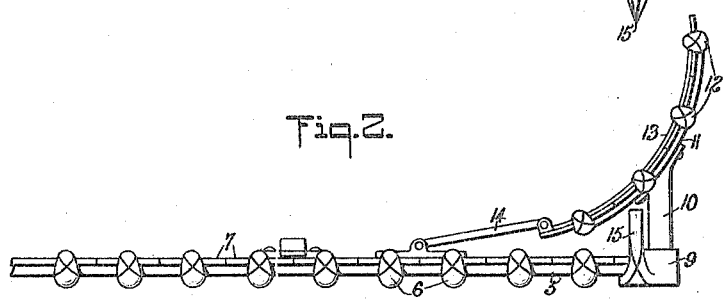
Fig. 2 is a front edge elevation of the bar illustrated in Fig. 1.

Referring to the drawings, 5 is the finger bar provided with the usual fingers 6 in which the cutting blades 7 of the cutter 8 are mounted to reciprocate. The finger bar 5 has at its free end a shoe 9 from which a support or standard 10 rises. An extension finger bar 11 is mounted on said support. As shown in Figs. 1 and 2, this extension is arcuated, forming preferably a part of a circle. This arcuated finger bar has the customary fingers 12 in which a curved cutter 13 of the customary construction is mounted to reciprocate in the fingers 12.

The cutter 13 is coupled to the cutter 8 of the main finger bar by a connecting rod 14 so that the reciprocating motion imparted to the cutter 8 is transmitted to the cutter 13. As will be seen, the cutter 13 extends vertically to a point outside of the swath bar 15 and will, therefore, cut the tangled part and make a clear cut.

Figure 3:
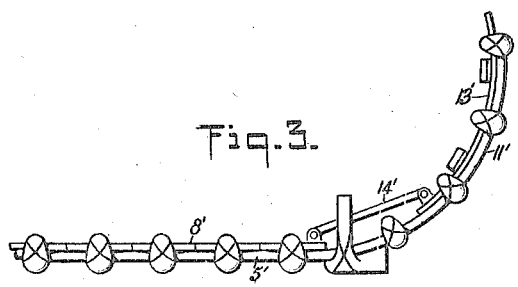
Fig. 3 is a similar elevation of a modified finger bar structure embodying my invention.

In Fig. 3 the finger bar extension 11' forms an integral part of the sickle bar 5', but the cutter 8' in the sickle bar 5' is separated from the cutter 13' which is mounted in the arcuated extension 11' and connected thereto by a connecting rod 14' so that the to and fro movement of the cutter 8' in the finger bar will cause the cutter 13' to move up and down in the extension 11'.

I claim:

In combination with the finger bar of a mowing machine having a main cutter mounted to reciprocate, of an auxiliary finger bar section rising above the main finger bar and near the free end of the same, and presenting a circular guide, an auxiliary cutter mounted to reciprocate in said circular guide of the finger-bar section, and a rod pivotally connected to the main cutter and to the auxiliary cutter.

EUGENE ANTZ.

Copies of this patent may be obtained for five cents each, by addressing the "Commissioner of Patents, Washington, D. C."